(12) United States Patent
Barbat et al.

(10) Patent No.: US 9,561,765 B1
(45) Date of Patent: Feb. 7, 2017

(54) FUEL TANK ASSEMBLY INCLUDING INFLATABLE MEMBER

(71) Applicant: Ford Global Technologies, LLC, Dearborn, MI (US)

(72) Inventors: Saeed David Barbat, Novi, MI (US); Iskander Farooq, Novi, MI (US); Dean M. Jaradi, Macomb, MI (US); Mohammed Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/817,288

(22) Filed: Aug. 4, 2015

(51) Int. Cl.
| | | |
|---|---|---|
| *B60R 19/00* | (2006.01) | |
| *B60R 19/20* | (2006.01) | |
| *B60K 15/063* | (2006.01) | |

(52) U.S. Cl.
CPC ........... *B60R 19/205* (2013.01); *B60K 15/063* (2013.01); *B60K 2015/0634* (2013.01)

(58) Field of Classification Search
CPC ..................... B60K 15/063; B60K 2015/0634; B60K 2015/03375; B60K 2015/03388; B60K 2015/03381; B60K 2015/0675; B60R 19/02; B60R 19/205; B64D 37/32
See application file for complete search history.

(56) References Cited

U.S. PATENT DOCUMENTS

| | | | | |
|---|---|---|---|---|
| 3,698,597 | A * | 10/1972 | Burke | B60K 15/03177 137/43 |
| 4,925,057 | A * | 5/1990 | Childress | B60K 15/077 169/45 |
| 7,350,851 | B2 * | 4/2008 | Barvosa-Carter | B60N 2/42709 296/187.02 |
| 7,455,119 | B2 * | 11/2008 | Thompson | A62C 3/07 169/58 |
| 7,597,153 | B2 * | 10/2009 | Thompson | A62C 3/07 137/493.6 |
| 7,861,884 | B2 * | 1/2011 | Childress | B60K 15/03 220/4.15 |

(Continued)

FOREIGN PATENT DOCUMENTS

| | | |
|---|---|---|
| CN | 104276289 A | 1/2015 |
| DE | 2719449 A1 | 11/1978 |

(Continued)

*Primary Examiner* — Paul N Dickson
*Assistant Examiner* — Timothy Wilhelm
(74) *Attorney, Agent, or Firm* — Frank MacKenzie; Bejin Beineman PLC (57) ABSTRACT

A fuel tank assembly includes a fuel tank, and an airbag assembly connected to a fuel tank. The fuel tank includes a first portion facing in a first direction, a second portion facing a second direction which is opposite the first direction. The fuel tank includes a rear portion extending between the first portion and the second portion and facing in a rear direction transverse to the first and second directions. The airbag assembly is connected to the first portion, the second portion, and the rear portion of the fuel tank. During a vehicle impact, an inflatable member of the airbag assembly in an inflatable position may deflect impact debris away from the fuel tank and/or may prevent underbody components from coming contacting the fuel tank.

20 Claims, 6 Drawing Sheets

(56) References Cited

U.S. PATENT DOCUMENTS

2006/0113128 A1* 6/2006 Sato .................. B60K 1/04
   180/65.1

FOREIGN PATENT DOCUMENTS

| EP | 1380460 B1 | 3/2008 |
|----|------------|--------|
| JP | 201042757 A | 2/2010 |
| KR | 20060061967 | 6/2006 |
| KR | 20070003408 | 1/2007 |

* cited by examiner

FUEL TANK ASSEMBLY INCLUDING INFLATABLE MEMBER

BACKGROUND

Vehicles are subject to a variety of standardized testing, such as the Federal Motor Vehicle Safety Standards (FMVSS) regulated by the National Highway and Traffic Safety Administration (NHTSA). One such standard that governs fuel system integrity is FMVSS 301. Specifically, FMVSS 301 defines the fuel spillage requirements for rear impacts up to 50 miles per hour. Some vehicles, for example police vehicles, may be tested at rear impacts up to 70 miles per hour.

Forces resulting from the rear impact may urge the vehicle to deform, including in areas around the fuel tank. Vehicles may be designed to include structural reinforcements and/or shields in order to absorb and/or deflect these forces away from the fuel tank. These additional components may disadvantageously add design and material cost, complexity, and weight to the vehicle. As such, there remains an opportunity to design a fuel tank assembly that satisfies testing such as the FMVSS 301 test while reducing the complexity and weight of structural reinforcements and/or shields in the area around the fuel tank assembly.

Additionally for some vehicles, such as the police cars and SUVs, extra reinforcements and structural barriers may be added to the vehicle in an effort to protect the fuel tank from damage or spillage, e.g., due to puncture, especially at higher speeds, e.g., speeds exceeding 70 mph. These reinforcements and structural barriers may result in more cost and weight. As such there is an opportunity to design a fuel tank to absorb such impacts while reducing additional structural reinforcements or shields and additional cost and weight associated therewith.

DETAILED DESCRIPTION

Figure 1:
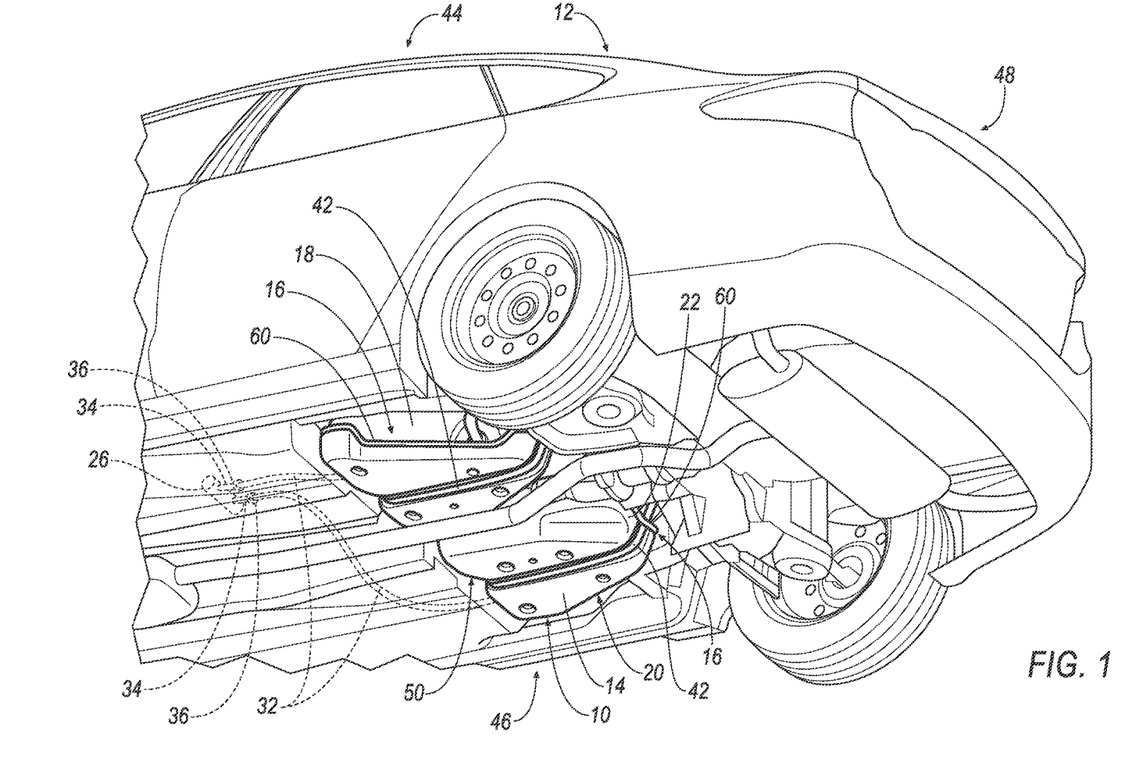
FIG. 1 is a perspective view of a rear portion of a vehicle including a fuel tank assembly with an airbag assembly in an uninflated position.
Figure 2:
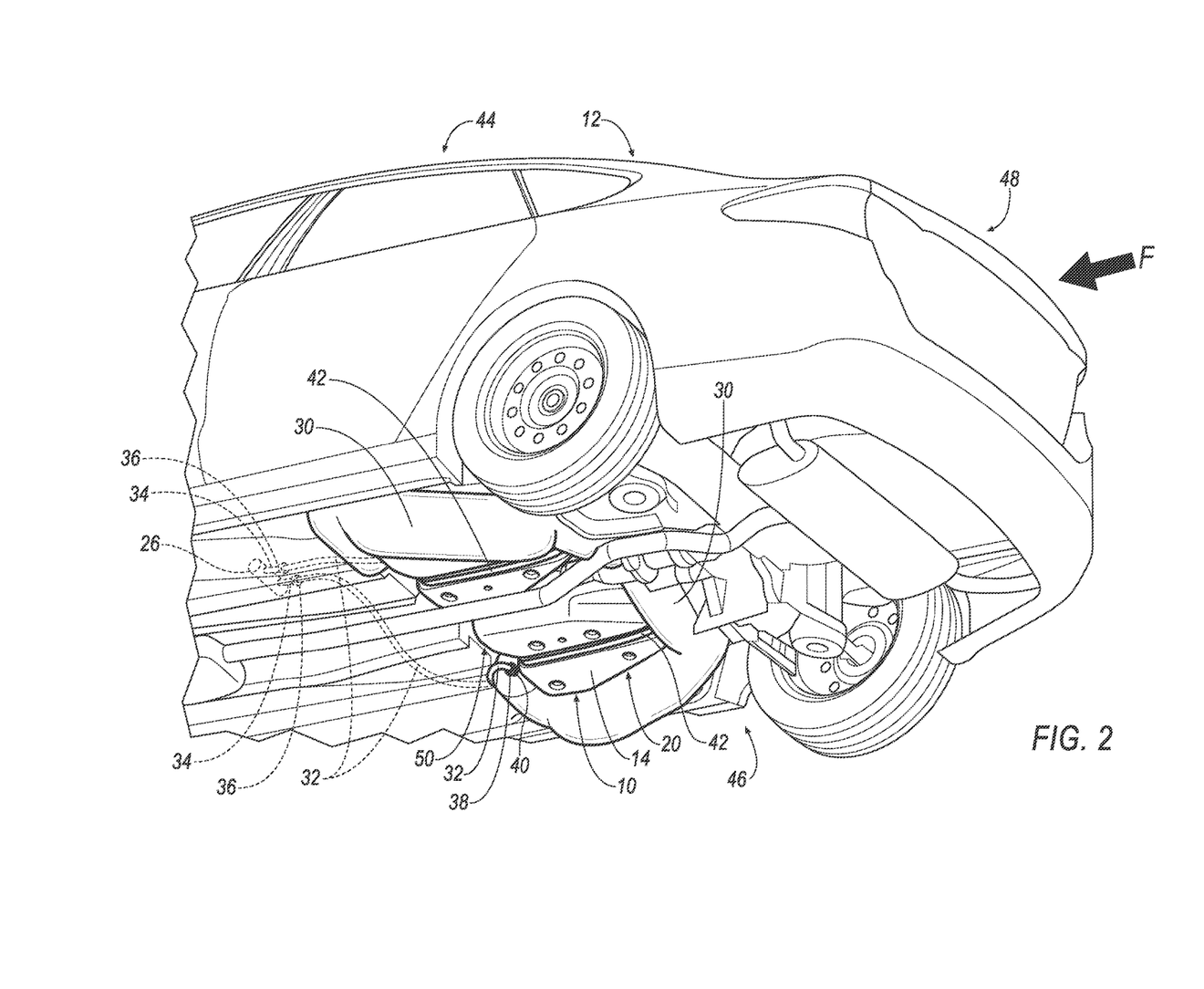
FIG. 2 is a perspective view of the rear portion of the vehicle with the airbag assembly in an inflated position.

With reference to the Figures, wherein like numerals indicate like parts throughout the several views, FIGS. 1-2 show a fuel tank assembly 10 for a vehicle 12 that includes a fuel tank 14 and an airbag assembly 16 connected to the fuel tank 14. The fuel tank 14 includes a first portion 18 facing in a first direction, and second portion 20 facing a second direction which is opposite the first direction. The fuel tank 14 includes a rear portion 22 extending between the first portion 18 and the second portion 20 and facing in a rear direction transverse to the first and second directions. The airbag assembly 16 is connected to the first portion 18, the second portion 20, and the rear portion 22 of the fuel tank 14, as shown in FIGS. 1-5.

Figure 3:
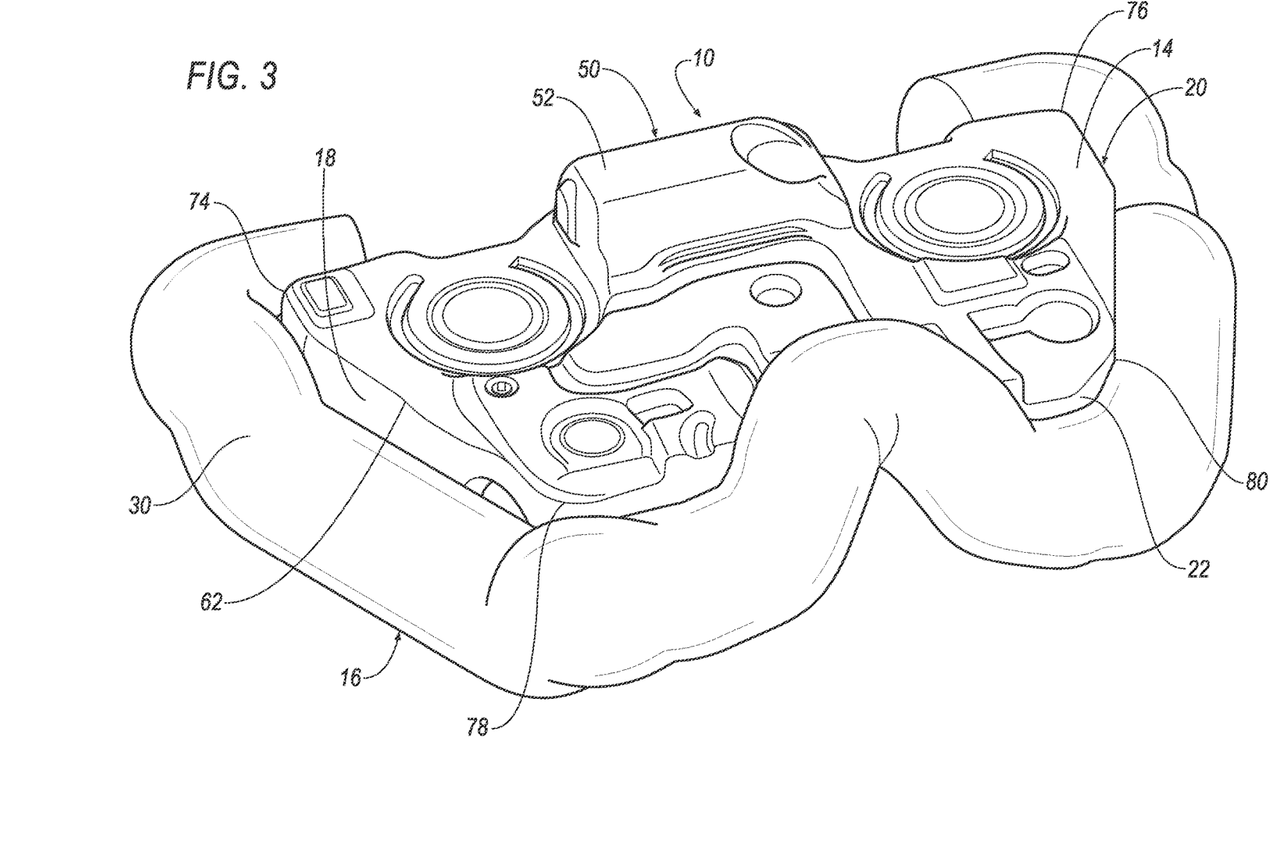
FIG. 3 is a perspective view of the fuel tank assembly with the airbag assembly in the inflated position as seen from a rear of the vehicle.
Figure 4:
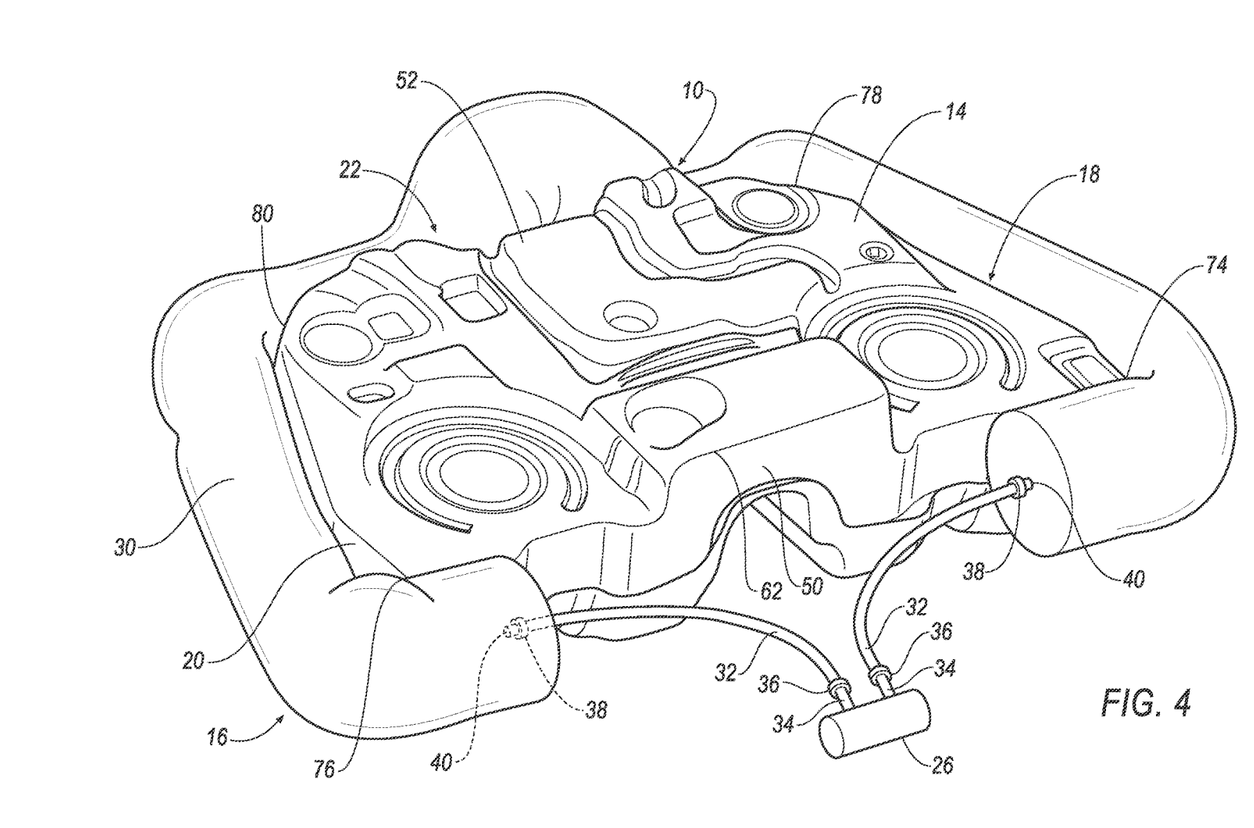
FIG. 4 is a perspective view of the fuel tank assembly with the airbag assembly in the inflated position as seen from a front of the vehicle.

With reference to FIGS. 1-2, during an impact of the vehicle 12, the airbag assembly 16 may be selectively inflated based on the direction of the impact, as set forth below. For example, as set forth below, during a rear end impact (identified with "F" in FIG. 2), and/or side impact of the vehicle 12, the airbag assembly 16 may inflate causing the airbag assembly 16 to extend along the first portion 18, the second portion 20, and the rear portion 22 of the fuel tank 14 as shown in FIGS. 2-4. In this situation, the airbag assembly 16 may deflect debris away from the fuel tank 14, which may reduce the likelihood of damage to the fuel tank 14. In addition, the airbag assembly 16 may prevent underbody components from deforming into and contacting the fuel tank 14 during the vehicle impact, which may reduce the likelihood of damage to the fuel tank 14. The airbag assembly 16 may allow for reduction or elimination of other reinforcing components, e.g., reinforcing structures and shields, around the fuel tank 14, which may reduce development time and cost.

The airbag assembly 16 may be a component of an impact absorbing system 24. The impact absorbing system 24 may include an inflator 26 in communication with the airbag assembly 16. Specifically, as set forth further below for example, the impact absorbing system 24 may sense an impact of the vehicle 12 and may trigger inflation of the airbag assembly 16 in response to the sensed impact. In addition, the impact absorbing system 24 may sense the type of impact, e.g., based on direction, magnitude, etc., and may trigger inflation of the airbag assembly 16 in response to the type of impact.

With reference to FIGS. 1-2 and as set forth above, the inflator 26 may be spaced from the fuel tank assembly 10 and installed forward of the fuel tank 14 toward a front end (not shown) of the vehicle 12. The inflator 26 may be concealed to limit or prevent environmental exposure, for example, water intrusion, salt spray, dust, etc. The inflator 26 may be mounted to a bracket (not shown), and the bracket may be mounted to a structural member (not shown) of the vehicle 12.

The inflator 26, when activated by the impact absorbing system 24, is configured to inflate an inflatable member 30 of the airbag assembly 16 to predetermined pressure. More specifically, the inflator 26 when activated by the impact absorbing system 24 may be configure to inflate the inflatable member 30 to a pressure of 10-20 pounds per square inch.

With reference to FIGS. 1-2 and 4, the impact absorbing system 24 may include a fill tube 32 extending from the inflator 26 to the airbag assembly 16. The inflator 26 may have one or more ports 34, e.g., two ports 34 as shown in the Figures, in communication with the airbag assembly 16 through the fill tube 32. The fill tube 32 may include a first end 36 fixed to the port 34 of the inflator 26, and a second end 38 spaced from the first end 36 and fixed to the inflatable member 30. The impact absorbing system 24 may include one or more fill tubes 32, e.g., two fill tubes 32 as shown in the Figures. The inflatable member 30 may include any suitable number of connection points 40 spaced from each other to receive the second end 38 of the fill tube 32.

The fill tube 32 may be formed of any suitable high strength flexible material. For example, the fill tube 32 may be nitrile rubber, nylon, thermoplastic elastomer (TPE), etc.

The inflator 26 may be, for example, a cold-gas inflator, which, when activated, ignites a pyrotechnic charge that creates an opening for releasing the pressurized inflation medium to the airbag assembly 16 via the fill tube 32. Alternatively, the inflator 26 may be of any suitable type, for example, a hybrid inflator.

With reference to FIGS. 1-2, the fuel tank assembly 10 may be received adjacent to the structural member of the vehicle 12. The fuel tank assembly 10 may be attached to the structural member with one or more straps 42. The straps 42 may be disposed between, i.e. sandwiched between, the fuel tank 14 and the airbag assembly 16.

As set forth above, the fuel tank 14 includes the first portion 18 facing in the first direction, and the second portion 20 facing in the second direction opposite the first direction. Specifically, with reference to FIGS. 1-2, the first portion 18 may face a left side 44 of the vehicle 12 and the second portion 20 may face a right side 46 of the vehicle 12. The rear portion 22 may face a rear end 48 of the vehicle 12. The fuel tank 14 may include a front portion 50 facing in a front direction opposite the rear direction. The front portion 50 may face the front end of the vehicle 12.

Figure 5:
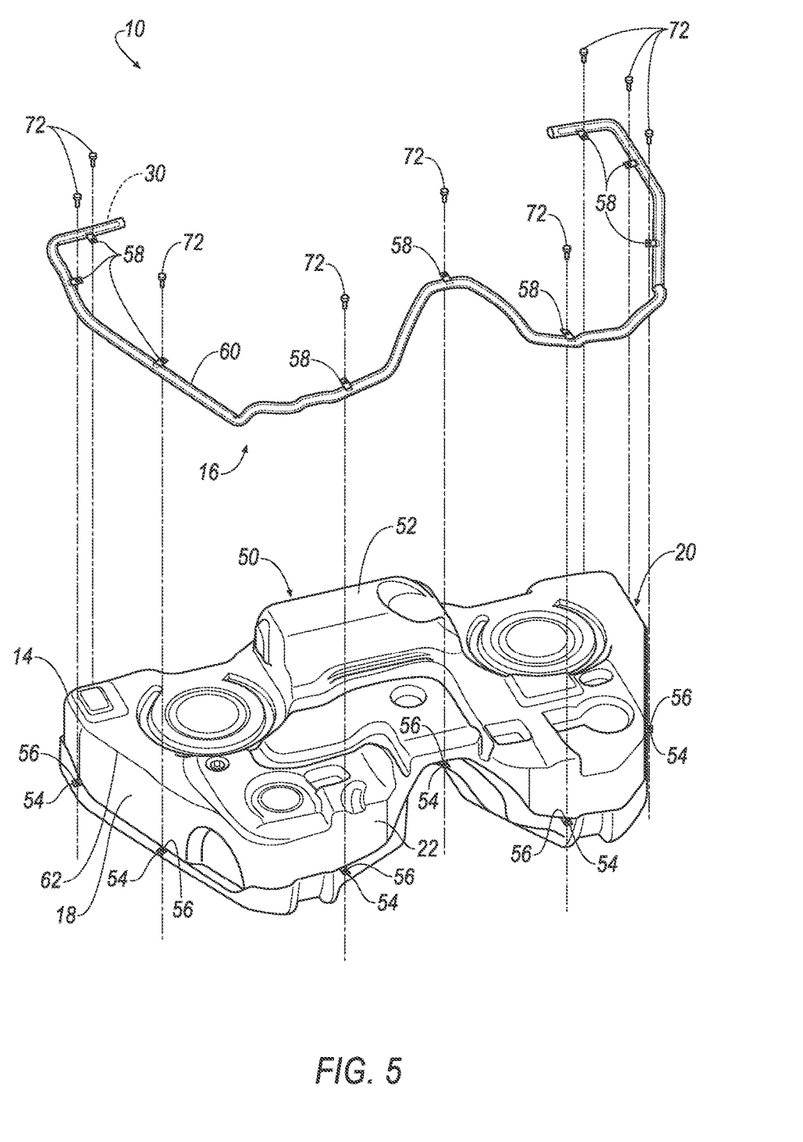
FIG. 5 is an exploded perspective view of the fuel tank assembly showing the airbag assembly and a fuel tank.

As shown in FIG. 3-5, the fuel tank 14 may include a top portion 52 extending between the first portion 18, the second portion 20, the rear portion 22, and the front portion 50. The top portion 52 faces upwardly in a direction transverse to the first direction, the second direction, the rear direction, and the front direction.

With reference to FIG. 5, the fuel tank 14 may include at least one flange 54 extending along the first portion 18, the second portion 20, the rear portion 22, and/or the front portion 50 of the fuel tank 14. For example, the fuel tank 14 may include a plurality of flanges 54 spaced from each other along the first portion 18, the second portion 20, the rear portion 22, and/or the front portion 50 of the fuel tank 14. The fuel tank 14 may include any suitable number of flanges 54, i.e., one or more.

The flange 54 may define a hole 56. As set forth below, the airbag assembly 16 may include a tab 58 engaged with the hole 56 of the flange 54 by a fastener 72. The fastener 72, for example, may be any suitable type of fastener such as a threaded bolt, rivet, etc.

The fuel tank 14 may be formed of any suitable material, e.g., metal such as steel, aluminum, etc. Alternatively, the fuel tank 14 may be formed of an engineered plastic, e.g., high-density polyethylene (HDPE). The fuel tank 14 may have any suitable cross-sectional shape, for example, rectangular (FIGS. 1-5), square, oval, circular, etc. The fuel tank 14 may have any suitable three-dimensional shape, for example, cube, elongated cube, cylindrical, sphere, etc. The fuel tank 14 may include two separate halves that are formed separately from, for example, a stamped process and may be subsequently fixed together by, e.g., welding, brazing, etc.

The fuel tank 14 may be of any suitable type for storing any suitable fuel/energy source. For example, the fuel tank 14 may store petrochemical fuels such as gasoline, diesel, etc. As another example, the fuel tank 14 may store a rechargeable battery, fuel cell, hydrogen tank, natural gas tank, etc.

The airbag assembly 16 may include one or more inflatable members 30 inflatable by the inflation medium. The airbag assembly 16 shown in the Figures includes one inflatable member 30, however, the airbag assembly 16 may include any suitable number of inflatable members 30.

The inflatable member 30 in an inflated position may extend continuously across one or more portions of the fuel tank 14, i.e. the first portion 18, the second portion 20, the rear portion 22, and/or the front portion 50 of the fuel tank 14. The inflatable member 30 may further extend across a left front corner 74 joining the first portion 18 and the front portion 50, and/or a right front corner 76 joining the second portion 20 and the front portion 50, and/or a left rear corner 78 joining the first portion 18 and the rear portion 22, and/or a right rear corner 80 joining the second portion 20 and the rear portion 22 as shown in FIGS. 3-4.

Alternatively, in the configuration where the airbag assembly 16 includes more than one inflatable member 30, each inflatable member 30 may extend across one or more of the first portion 18, the second portion 20, the rear portion 22, and/or the front portion 50 of the fuel tank 14. These individual inflatable members 30 may be fluidly connected to each other, or may be independently inflatable by the inflator 26.

With reference to FIGS. 1 and 5, the airbag assembly 16 may include an inflatable member 30 and an outer covering 60 on the inflatable member 30. The outer covering 60 houses the inflatable member 30 when the inflatable member 30 is in an uninflated position. The inflatable member 30 in the uninflated position may be, for example, folded, rolled, etc. within the outer covering 60. The outer covering 60 may include a tear seam (not shown) that may provide an inflate direction for the inflatable member 30 to inflate. The inflatable member 30 may tear the tear seam when the inflatable member 30 inflates from the uninflated position to the inflated position. When the tear seam tears, the inflatable member 30 may be exposed outside the outer covering 60 as shown in FIGS. 2-4.

The outer covering 60 may be formed of any suitable material. Specifically, the outer covering 60 may be configured to, i.e., sized, shaped, material, etc., protect the inflatable member 30 from driving conditions when the inflatable member 30 is in the uninflated position. The outer covering 60 may be, for example, formed of nylon, polyester, etc.

With reference to FIGS. 2-5, the inflatable member 30 may be formed of an auxetic material. For example, the auxetic material may include auxetic yarns that may be combined with other yarns and fibers to optimize the performance, e.g., puncture resistance, tear resistance, of the auxetic material. As another example, the inflatable member 30 may be formed from an ultra-high molecular weight polyethylene (UHMwPE) material. For example, the fibers of the UHMwPE material may be oriented in a particular pattern to optimize the performance, e.g., puncture resistance, tear resistance, of the UHMwPE material.

The inflatable member 30 may be unvented for the purpose of containing the inflation medium within the inflatable member 30 for a period of time, for example, greater than one second.

As set forth above, the airbag assembly 16 extends across at least one of the first portion 18, the second portion 20, the rear portion 22 and/or the front portion 50 of the fuel tank 14 in the inflated position. Specifically, the airbag assembly 16 may be connected directly to the first portion 18, the second portion 20, the rear portion 22, and/or the front portion 50. Alternatively, the airbag assembly 16 may be connected to another component of the fuel tank 14.

The airbag assembly 16 may, for example, include tabs 58 connected to and spaced along the inflatable member 30, as shown in FIG. 5. The tabs 58 may extend through the outer covering 60. The tabs 58 may be connected to the inflatable member 30 in any suitable manner, e.g., stitching, bonding, and/or adhesive, etc. The tabs 58, for example, may be connected to the first portion 18, the second portion 20, the rear portion 22, and/or the front portion 50 of the fuel tank 14. As another example, the tabs 58 of the inflatable member 30 may be connected to the top portion 52 of the fuel tank 14. In this configuration, the inflatable member 30 in the inflated position may extend across the first portion 18, the second portion 20, the rear portion 22, and/or the front portion 50 of the fuel tank 14.

Specifically, the top portion 52 may support the airbag assembly 16 around a perimeter 62 of the top portion 52. In such a configuration, during a vehicle impact, the inflatable member 30 of the airbag assembly 16 may inflate from the uninflated position to the inflated position. In this inflated position, the inflatable member 30 may extend from the top portion 52 across the first portion 18, the second portion 20, the rear portion 22 and/or the front portion 50 of the fuel tank 14.

Figure 6:
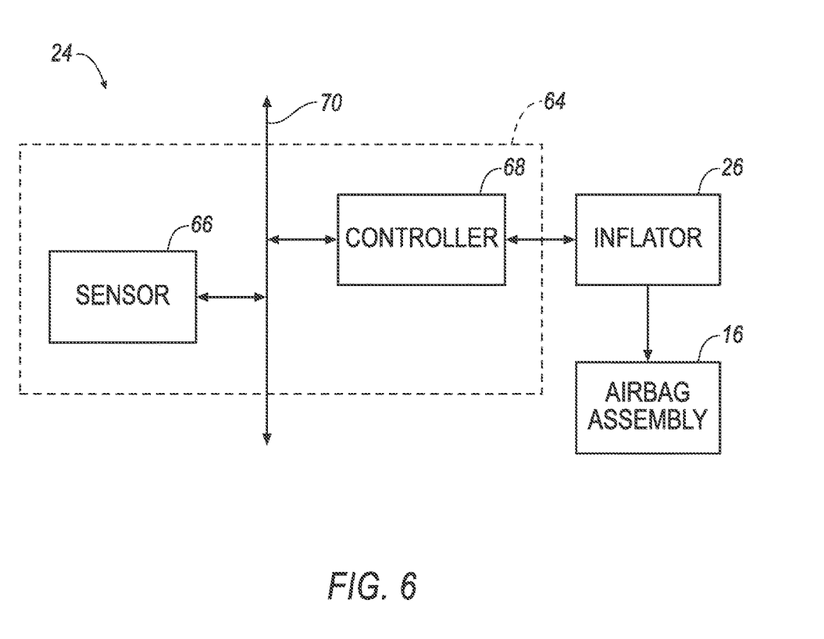
FIG. 6 is a schematic of an impact absorbing system of the vehicle.

A schematic of the impact absorbing system 24 which includes an impact sensing system 64, the inflator 26, and the airbag assembly 16 is shown in FIG. 6. The impact sensing system 64 may include at least one sensor 66 for sensing impact of the vehicle 12, and a controller 68 in communication with the sensor 66 and the inflator 26 for activating the inflator 26, e.g., for providing an impulse to a pyrotechnic charge of the inflator 26, when the sensor 66 senses an impact of the vehicle 12. Alternatively or additionally to sensing impact, the impact sensing system 64 may be configured to sense impact prior to impact, i.e., pre-impact sensing. The sensor 66 may be of any suitable type, e.g., using radar, lidar, and/or a vision system. The vision system may include one or more cameras, CCD image sensors, and/or CMOS image sensor, etc.

The controller 68 may be a microprocessor-based controller. The sensor 66 is in communication with the controller 68 to communicate data to the controller 68. Based on the data communicated by the sensor 66, the controller 68 instructs the inflator 26 to activate. The impact sensing system 64 may instruct the inflator 26 to activate on either a front end impact, a rear end impact, or a side impact of the vehicle.

The controller 68 and the sensor 66 may be connected to a communication bus 70, such as a controller area network (CAN) bus, of the vehicle 12. The controller 68 may use information from the communication bus 70 to control the activation of the inflator 26. The inflator 26 may be connected to the controller 68, as shown in FIG. 6, or may be connected directly to the communication bus 70.

In operation, the airbag assembly 16 is in the uninflated position, as shown in FIGS. 1 and 5, under normal operating conditions of the vehicle 12. When the sensor 66 senses an impact of the vehicle 12, the impact sensing system 64 triggers the inflator 26 to inflate the inflatable member 30 of the airbag assembly 16 with the inflation medium from the uninflated position to the inflated position. In particular, based on the type of impact sensed by the impact sensing system 64, the impact sensing system 64 inflates the inflatable member 30 to the inflated position as shown in FIGS. 2-4.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A fuel tank assembly comprising:
a fuel tank having an exterior surface, the fuel tank including a first portion facing in a first direction, a second portion facing a second direction opposite the first direction, and a rear portion extending between the first portion and the second portion and facing in a rear direction transverse to the first and second directions; and
an airbag assembly having an inflatable member on the external surface and being flexible relative to the fuel tank, the airbag assembly connected to the first portion, the second portion, and the rear portion.

2. The fuel tank assembly as set forth in claim 1, wherein the fuel tank includes a front portion facing in a front direction opposite the rear direction and the airbag assembly is connected to the front portion.

3. The fuel tank assembly as set forth in claim 1, wherein the inflatable member extends continuously across the first portion, the second portion, and the rear portion.

4. The fuel tank assembly as set forth in claim 1, wherein the inflatable member is formed of an auxetic material.

5. The fuel tank assembly as set forth in claim 1, wherein the inflatable member is formed of an ultra-high molecular weight polyethylene material.

6. The fuel tank assembly as set forth in claim 1, wherein the airbag assembly includes tabs spaced along the inflatable member, the tabs being connected to the first portion, the second portion, and the rear portion.

7. The fuel tank assembly as set forth in claim 6, wherein the fuel tank includes at least one flange extending along the first portion, the second portion, and the rear portion, the tabs being connected to the flange.

8. The fuel tank assembly as set forth in claim 1, wherein the airbag assembly includes an outer covering on the inflatable member.

9. The fuel tank assembly as set forth in claim 8, wherein the airbag assembly includes tabs connected to and spaced along the inflatable member and extending through the outer covering, the tabs being connected to the first portion, the second portion, and the rear portion.

10. A system comprising:
a fuel tank having an exterior surface, the fuel tank including a first portion facing in a first direction, a second portion facing a second direction opposite the first direction, and a rear portion extending between the first portion and the second portion and facing in a rear direction transverse to the first and second directions;
an airbag assembly having an inflatable member on the external surface and being flexible relative to the fuel tank, the airbag assembly connected to the first portion, the second portion, and the rear portion; and
an inflator in communication with the airbag assembly.

11. The system as set forth in claim 10, wherein the inflator is spaced from the fuel tank.

12. The system as set forth in claim 10, further comprising an impact sensing system in communication with the inflator.

13. The system as set forth in claim 10, wherein the inflator is configured to inflate the airbag assembly to 10-20 pounds per square inch.

14. The system as set forth in claim 10, wherein the airbag assembly is unvented.

15. The system as set forth in claim 10, wherein the fuel tank includes a front portion facing in a front direction opposite the rear direction and the airbag assembly is connected to the front portion.

16. The system as set forth in claim 10, wherein the inflatable member extends continuously across the first portion, the second portion, and the rear portion.

17. The system as set forth in claim 10, wherein the inflatable member is formed of an auxetic material.

18. The system as set forth in claim 10, wherein the inflatable member is formed of an ultra-high molecular weight polyethylene material.

19. The system as set forth in claim 10, wherein the airbag assembly includes tabs spaced along the inflatable member, the tabs being connected to the first portion, the second portion, and the rear portion.

20. A fuel tank assembly comprising:
  a fuel tank having an exterior surface, the fuel tank including a first portion facing in a first direction, a second portion facing a second direction opposite the first direction, and a rear portion extending between the first portion and the second portion and facing in a rear direction transverse to the first and second directions; and
  an airbag assembly having an inflatable member on the external surface and being flexible relative to the fuel tank, the inflatable member supported by the fuel tank and inflatable to an inflated position extending across the first portion, the second portion, and the rear portion.

\* \* \* \* \*